United States Patent Office 3,532,376
Patented Oct. 6, 1970

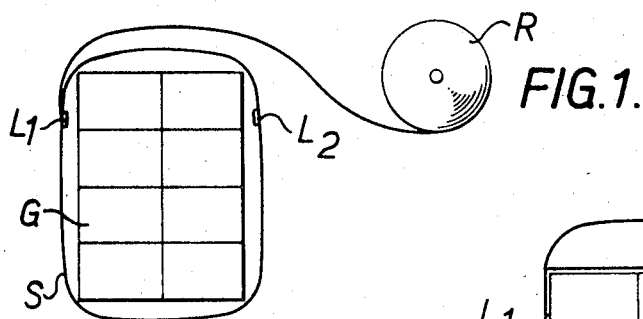
FIG.1.
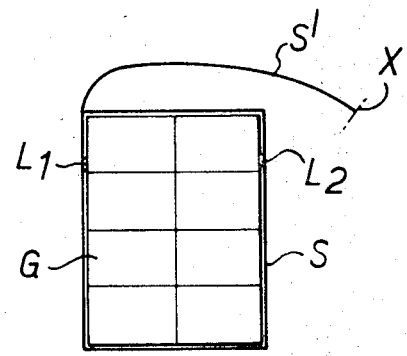
FIG. 2.
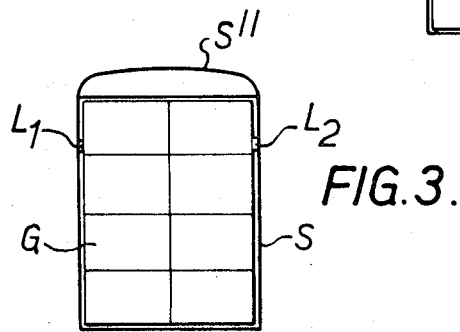
FIG.3.
FIG.4.
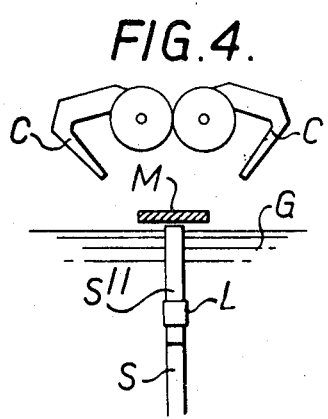
FIG.5.
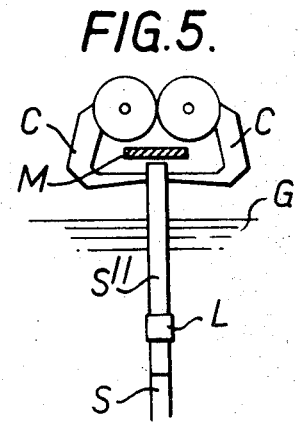

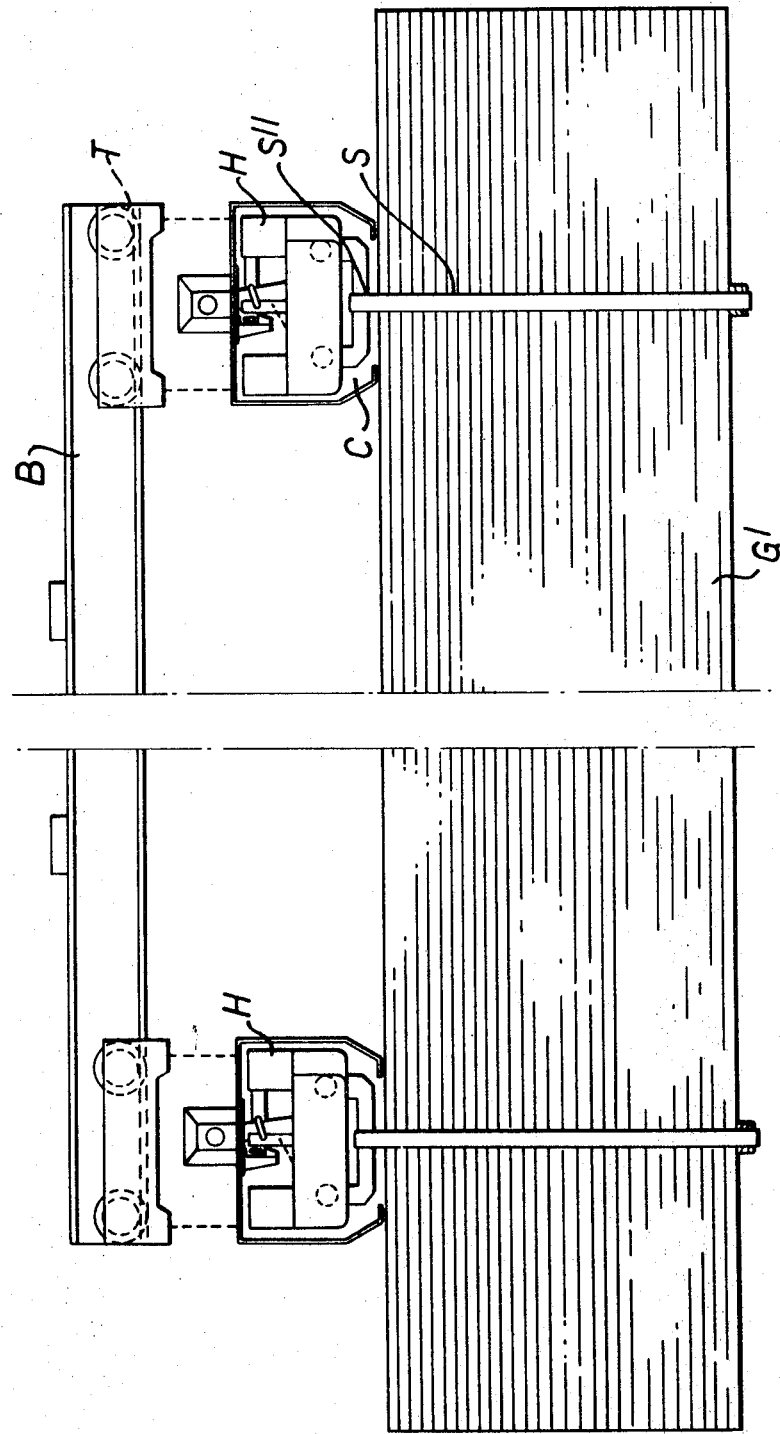

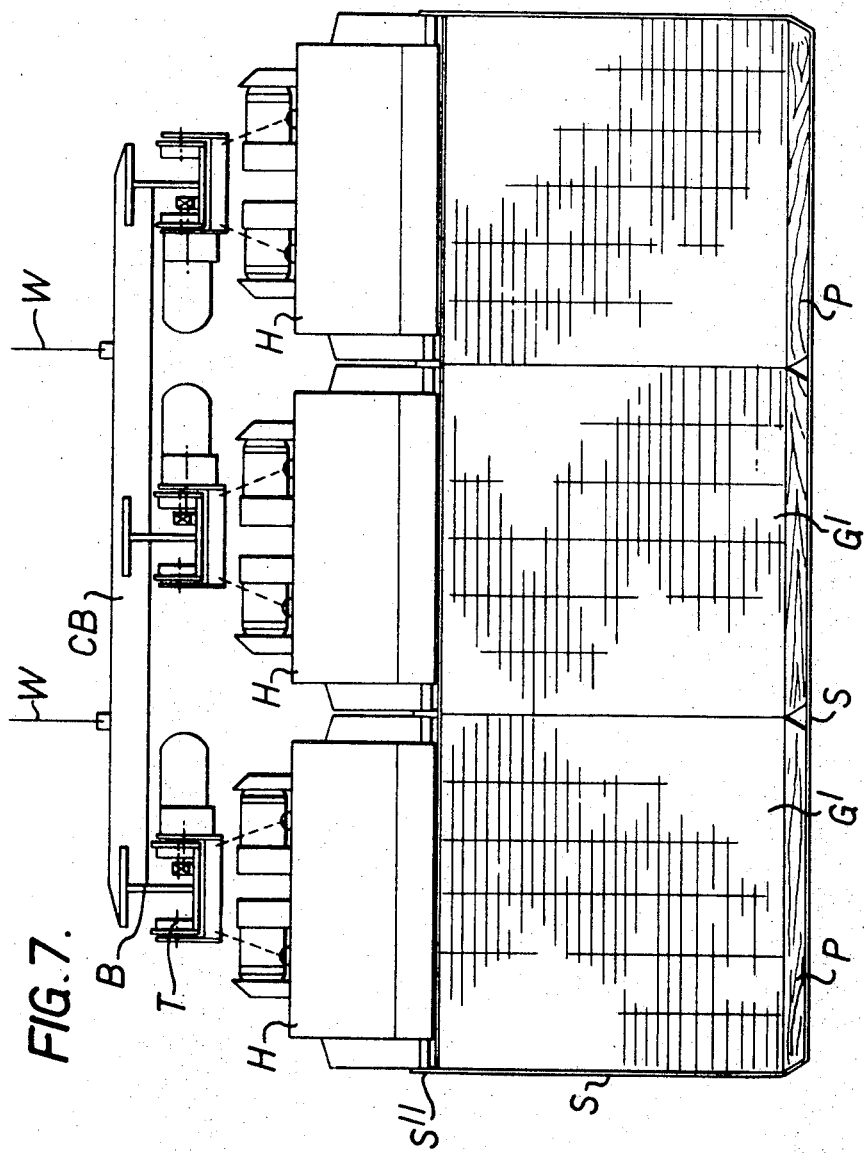

3,532,376
APPARATUS FOR THE LIFTING OF TRANSPORT GOODS
Fredrick Munck, Bergen, Norway, assignor to Sverre Munck A/S, Bergen, Norway
Original application Sept. 21, 1967, Ser. No. 669,473, now Patent No. 3,438,521, dated Apr. 15, 1969. Divided and this application Sept. 30, 1968, Ser. No. 798,230
Claims priority, application Norway, Sept. 26, 1966, 146,891
Int. Cl. B66c 17/04
U.S. Cl. 294—74     3 Claims

ABSTRACT OF THE DISCLOSURE

An arrangement for lifting a bale like transport unit. A steel band is secured tightly about the unit and extended to form a free lifting loop thereabove. The unit is lifted and carried by an arangement including a magnet which raises the steel band, and claws which grasp the lifting loop. The claws and the magnet may be arranged on a lifting head which is then mounted for movement along a rail beam of a suspended framework.

---

This application is a division of my previous application Ser. No. 669,473, filed Sept. 21, 1967, now Pat. No. 3,438,521.

The present invention relates to a method for lifting of such transport goods as for example wood materials, bales, etc., which are assembled to suitable dimensioned transport units of convenient weight.

Previously such assembled transport units were lifted either by means of a strap being laid around the goods for its assemblage and lifting or fork trucks or the like were used based on the fork lifting principle.

The previously known methods and devices made it necessary to restrict the dimensions and weight of the units to be lifted to a maximum of about 2 tons. For modern transport arrangements including loading and unloading it is desirable to increase the capacity substantially. This is carried out by assembling the transport goods by means of the method according to the invention to form larger and better assembled units than previously was possible. At the same time the invention provides means whereby a number of such units can be lifted by a convenient crane or the like.

To have a better understanding of the invention reference is had to the drawings, where schematically is shown the method used for the assembling of the transport goods according to the invention, as well as an example of a device for the lifting of the goods.

FIGS. 1–3 show schematically how the transport goods are strapped and arranged for the lifting.

FIGS. 4 and 5 show schematically the means by which the lifting is carried out.

FIGS. 6 and 7 show seen from the one side respective from the end an example of a device for simultaneous lifting of a number of transport units.

In FIGS. 1–3 is seen how the strapping of a number of units on point of principle is carried out. In the figures these are suggested as bales or boxes, which as a whole are denoted G. In the example shown there are displayed eight bales or boxes in each transport unit. Around such unit is laid one or more straps according to the length of the goods to be lifted. Each strap is obtained by forming around the unit a loop S of steel band, which is taken from a suitable supply, for example the roll R. The loop S is provided with two strapping band locks 11 and 12.

In FIG. 2 is shown how said loop S is tightened so that it lies firmly against the external surfaces of the goods and maintains the bales or boxes as an assembled transport unit. A length S' of the band is then cut off as seen in FIG. 2. The cut off end piece X is then connected with the loop S by means of the band lock 12.

Thereby the transport unit of FIG. 3 is obtained. The goods G is here firmly assembled by the steel band strapping S, and this is at the top provided with a lifting loop or handle S" of the same steel band material and secured to the loop S by the band locks 11 and 12.

In accordance with a further feature o fthe invention the device, by means of which the unit G should be lifted hanging in the lifting loop S", is provided with magnets arranged in connection with lifting hooks or claws. In the example shown in FIGS. 4 and 5 the magnet member is indicated at M and the lifting claws are constituted by cooperating rotatably journalled arms C, C. In FIG. 4 is shown how the lifting device is lowered down over the transport unit G so that the magnet M rests against the top surface of the lifting loop S". The magnet M is then lifted up to the position shown in FIG. 5, and the claws C, C are swung against each other so that they grip under the steel band loop S", whereupon the unit G can be lifted hanging under said loop.

In FIGS. 6 and 7 is shown a larger device by means of which transport units G', according to the above described principle can be lifted. In the example of FIGS. 6 and 7 the transport unit is built up from a number of boards or planks held together by the steel band strapping S to form suitable units. If the boards or planks are long, and especially if it is a question of timber in full lengths, the lifting heads H comprising the gripping claws C and the magnets M cooperate with several loops S, S", arranged along the length of the transport unit G'. The lifting heads are then preferably suspended from travelling carriages running on rail beams B, which form a part of a suitable framework CB provided with means for suspension from a wire W from a crane or other displacement device. By such arrangement is made possible lifting up to eight tons or more, which highly hastens loading and unloading, makes such work more simple and reduces time and workers.

Damage of the goods further according to experience is substantially reduced due to the assembling of the goods so that damage is prevented. Thus cross planks P or the like are placed in known way to prevent pressing in of the lower corners of the unit G'. At the top such constriction does not make itself so much felt, as the lifting is carried out by the straps S". Said straps further, in accordance with a preferred embodiment, are not gripped at the middle by a pair of claws C, C, but by such a pair of claws arranged near each end of the lifting loop S", as will be seen from FIG. 7.

It will be understood that according to the invention there are provided a method and devices, whereby substantial advantages are obtained for loading and unloading, and the goods to be transported are assembled to units. Especially for timber and wood materials the invention is of major significance. Also for other transport goods units, as boxes, bales, rods, tubes or the like the proposed strapping and assembling to units can be useful as also the described lifting device.

I claim:

1. An apparatus for lifting a unit of transport goods comprising a continuous steel band extending around said unit and locked at one side of the unit by a band lock to form a first loop which tightly engages the unit, a portion of said continuous band extending upwardly from said band lock and forming a free lifting loop above the unit, and the free end of said band portion being locked on the side of the unit opposite from said one side thereof, and including a lifting head assembly including a lifting claw and a magnet operatively connected together such that the magnet exerts an upward magnetic force on the steel band of the loop to raise the same upwardly as the lifting claw engages in the raised loop to pull the unit upwardly.

2. An apparatus according to claim 1 including a framework having a rail beam and adapted to be suspended from a crane or the like, said lifting head assembly being mounted for movement longitudinally of said rail beam.

3. An apparatus according to claim 2, including a carriage which mounted on said rail beam for movement therealong, said lifting head being suspended from said carriage.

References Cited

UNITED STATES PATENTS

| | | | |
|---|---|---|---|
| 1,296,756 | 3/1919 | Buckley | 212—10 |
| 1,663,708 | 3/1928 | Keller | 224—55 |
| 2,850,189 | 9/1958 | Leroy | 214—658 X |
| 3,413,027 | 11/1968 | Bohlin | 294—74 X |

GERALD M. FORLENZA, Primary Examiner

G. F. ABRAHAM, Assistant Examiner

U.S. Cl. X.R.

294—81; 214—114